United States Patent [19]

Smith

[11] 4,441,312
[45] Apr. 10, 1984

[54] COMBINED CYCLE RAMJET ENGINE

[75] Inventor: John R. Smith, Kettering, Ohio

[73] Assignee: The United States of America as represented by the Secretary of the Air Force, Washington, D.C.

[21] Appl. No.: 51,315

[22] Filed: Jun. 22, 1979

[51] Int. Cl.³ .............................................. F02C 9/78
[52] U.S. Cl. ........................................ 60/245; 60/251
[58] Field of Search .................... 60/245, 270 S, 250, 60/251, 270 R; 102/101, 102

[56] References Cited

U.S. PATENT DOCUMENTS

| | | | |
|---|---|---|---|
| 2,799,987 | 7/1957 | Chandler | 60/270 S |
| 3,052,092 | 9/1962 | Kirkbride | 60/250 |
| 3,301,785 | 1/1967 | Ratliff et al. | 60/255 |
| 3,357,187 | 12/1967 | Whitlock | 60/270 S |
| 3,373,564 | 3/1968 | Maybin | 60/245 |
| 3,535,881 | 10/1970 | Schubert | 60/270 S |
| 3,901,028 | 8/1975 | Leingang | 60/245 |
| 4,063,415 | 12/1977 | Rhoades | 60/270 S |
| 4,203,284 | 5/1980 | Luscan et al. | 60/245 |

OTHER PUBLICATIONS

Sutton; G. P., "Rocket Propulsion Elements", 4th Edition, John Wiley & Sons, N.Y., 1976, pp. 397-401.
Sutton; G. P., "Rocket Propulsion Elements", 4th Edition, John Wiley & Sons, N.Y., 1976, pp. 276-279.

*Primary Examiner*—Louis J. Casaregola
*Attorney, Agent, or Firm*—Donald J. Singer; Thomas L. Kundert

[57] ABSTRACT

The metallic wall of the combustion chamber of a combined rocket-ramjet engine is lined with solid ramjet fuel overlaid with rocket fuel. After the consumption of the rocket fuel in the boost portion of the flight the solid ramjet fuel burns and ablates protecting the metallic combustion chamber wall from high temperatures during the cruise phase of the missile flight.

1 Claim, 8 Drawing Figures

COMBINED CYCLE RAMJET ENGINE

RIGHTS OF THE GOVERNMENT

The invention described herein may be manufactured and used by or for the Government of the United States for all governmental purposes without the payment of any royalty.

BACKGROUND OF THE INVENTION

Combination rocket and ramjet engines are well known as exemplified by U.S. Pat. No. 3,535,881 to patentee Schubert. Solid fuel ramjet engines are also known as shown by Chandler in U.S. Pat. No. 2,799,987. The prior art combination rocket and ramjet engines have had the problem of the metallic walls of the combustion chamber becoming too hot and melting during the cruise portion of the flight.

BRIEF SUMMARY OF THE INVENTION

The invention provides an improved combination rocket and ramjet engine that is not susceptable to combustion chamber burnthrough. Generally the invention also improves engine performance during the ramjet phase of operation because part of the propellant of the primary gas generation is an oxidant and the greater the percentage of the ramjet solid fuel that is utilized the greater the improvement in performance.

DESCRIPTION OF THE PREFERRED EMBODIMENT

Figure 1:
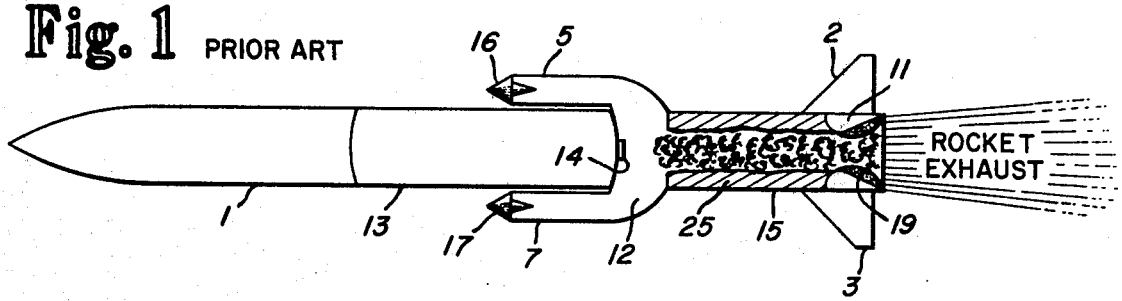
FIG. 1 is a schematic diagram, in partial section, of a missile having a prior art combined rocket and ramjet engine during the rocket phase of operation.
Figure 2:
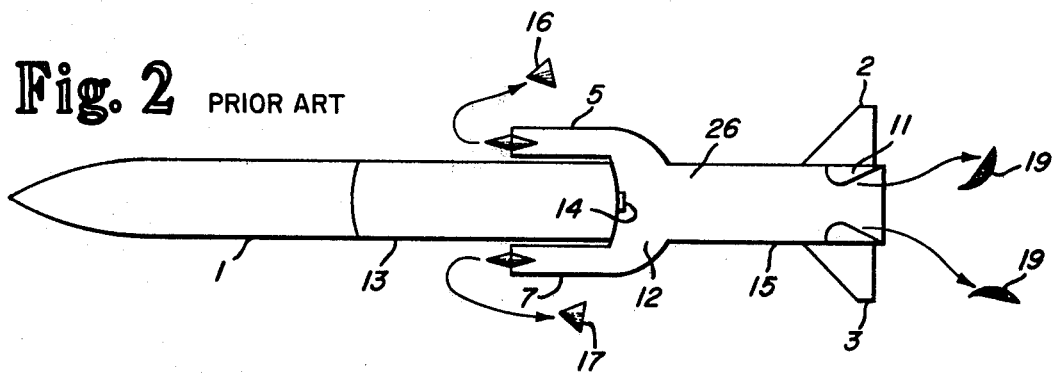
FIG. 2 is a schematic diagram of the same prior art device during the transition stage from rocket to ramjet operation.
Figure 3:
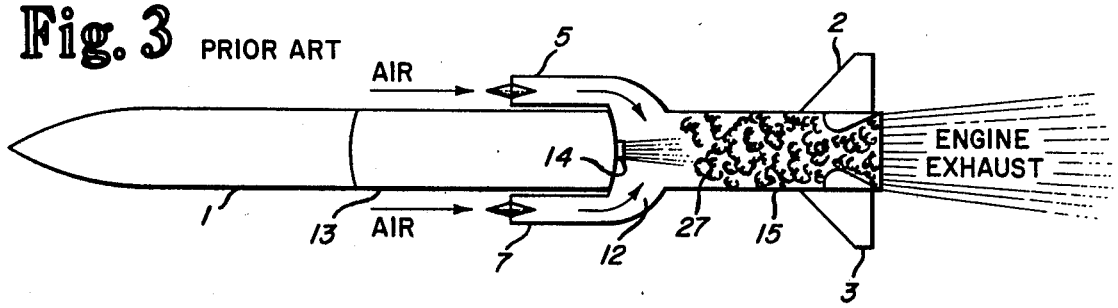
FIG. 3 is a schematic diagram of the same prior art device during the ramjet or cruise phase of operation.

The "state-of-the-art" for integral rocket-ramjet engines, using either liquid or solid fuels, and ducted rockets is such that the normal practice is to place the rocket boost propellant in the ramjet combustion chamber to provide the boost required for accelerating the missile to the proper speed for ramjet takeover. This is illustrated in FIGS. 1, 2, and 3. During the boost phase, as illustrated in FIG. 1, it is necessary to close off the inlets 5, 7 to the ramjets, so that the rocket does not exhaust through these ports. In addition, current practice requires a smaller nozzle throat diameter during rocket boost than is required for the ramjet or ducted rocket cruise portion of the missile flight. Therefore, for the boost portion of flight, inlet port covers 16, 17 and a smaller exhaust nozzle 19 are utilized. At completion of rocket boost, when the rocket propellant 25 is expended, the port covers and the smaller rocket exhaust nozzle insert are removed. One method of removing these devices is through the use of explosive bolts. The falling away of the inlet covers and the breaking up and falling away of the inner nozzle is illustrated in FIG. 2, also the empty ramjet combustion chamber 26.

During the cruise portion of the missile flight illustrated in FIG. 3, for both the ramjet using liquid fuel and ducted rocket propulsion, the gas temperature in the combustion chamber 27 into which the air is forced by the inlet is hot enough to require some form of insulation for the metal wall 15 of the chamber to keep it from overheating and thus melting.

In the case of the prior art solid fuel ramjet, the combustion chamber is lined with the solid fuel. The fuel is supplied to the combustion zone as a vapor through ablation. This ablation also thermally protects the wall, thus the fuel also acts as an insulation. The fuel provides such a thermal barrier that additional insulation is not required for those areas lined with fuel. Areas not lined with fuel (such as exhaust nozzles) and subject to combustion temperatures still need the thermal protection provided by special materials and/or insulations.

FIGS. 1 through 3 illustrate the operational sequence used in the "state-of-the-art" ducted rocket engines FIG. 1 indicates those portions of the engine system closed off during the boost phase. Also shown is the rocket propellant location 25, and the smaller rocket nozzle 19 used during boost. FIG. 2 indicates the removal of the inlet covers and ejection of the rocket nozzle during transition from rocket boost to the cruise portion of the flight. FIG. 3 indicates the operation of the ducted rocket or ramjet engine during the cruise portion of the missile flight.

U.S. Pat. No. 3,535,881 to Schubert describes lining the ramjet combustion chamber with a solid oxidizer rich propellant. During boost, fuel rich propellants are expelled from an auxiliary combustion chamber (gas generator) into the ramjet combustion chamber which now has the air inlets blocked off. These fuel rich components combine with the oxidizer rich components providing an overall efficient rocket boost to the missile. After completing the boost, the oxidizer rich propellant in the ramjet combustion chamber is completely burned out. During cruise, Schubert provides a fuel rich propellant from the auxiliary combustion chamber into the ramjet combustion chamber, where outside air is forced into the combustion chamber to further burn the fuel rich propellants, thus providing a more complete and efficient combustion reaction. This portion of the missile flight operates on the same principle as described in the above "state-of-the-art" description. Different propellant expulsion rates from the auxiliary combustion chamber are required for boost and for the cruise portion of the missile flight. Schubert provides this variation through various shapes of the fuel with different burn rates.

The present invention utilizes the same principle for boost to cruise conditions as described in the above "state-of-the-art" description. Namely, rocket propellant is placed in the combustion chamber over the solid ramjet fuel which lines the combustion chamber walls. Also, the ramjet air inlets are blocked off and a smaller exhaust nozzle is used for rocket boost than for cruise conditions. These items are conventionally removed at completion of the boost phase.

The present invention differs from the "state-of-the-art" devices and Schubert's invention in the cruise portion of the missile flight. In the herein disclosed invention the hot gases being expelled from the auxiliary combustion chamber (gas generator) are discharged into the ramjet combustion chamber causing ablation and subsequent burning of the solid ramjet fuel.

The ratio of the gases coming from the auxiliary combustion chamber to that provided by the solid ramjet fuel would be conventionally determined by the missile system design. Likewise, the composition of the gases from the auxiliary combustion chamber (i.e., how fuel rich should it be) would be conventionally determined by missile system studies to determine the optimum mixture for the particular missile requirements involved.

The disclosed invention provides thermal protection, a critical problem, to the ramjet combustion chamber during both boost and cruise portion of the missile flight. None of the prior art devices provide this protection during the cruise portion of flight. The invention also provides greater overall missile performance as the fuel (also an insulator) is being used as the flight progresses. In the prior devices an insulation to the metal combustion chamber must be provided and would be with the missile during the entire flight. This is an additional weight penalty that reduces missile performance (range). Some promising insulating materials that can withstand the high temperatures of the combustion process are currently being evaluated; but, it is anticipated that even if these prove satisfactory for use, they will cost more to make than the disclosed system.

Figure 4:
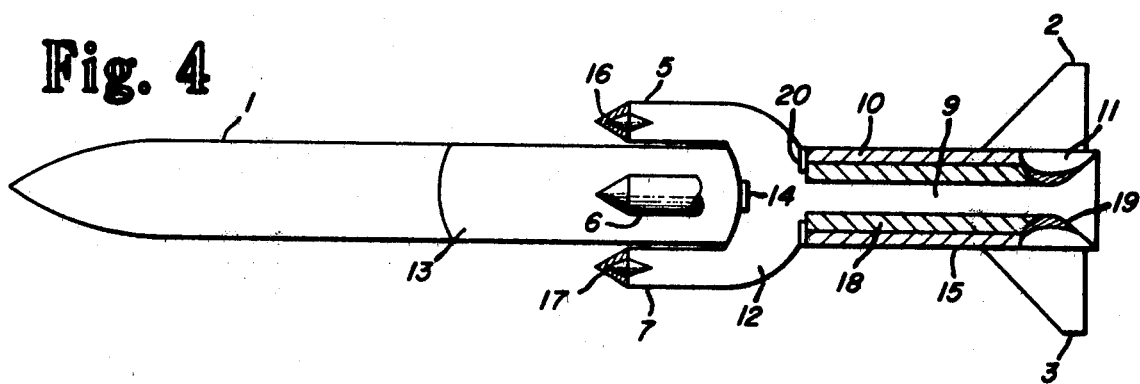
FIG. 4 is a schematic diagram, in partial section, of a missile having a typical embodiment of the invention in its propulsion system.
Figure 5:
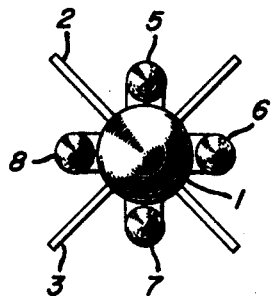
FIG. 5 is a front head-on view of the missile of FIG. 4.
Figure 6:
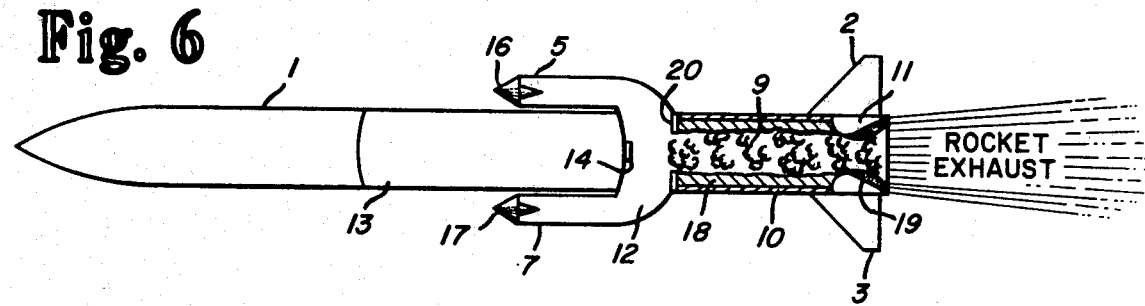
FIG. 6 is a schematic diagram in partial section of an embodiment of the invention during the boost phase of operation.
Figure 7:
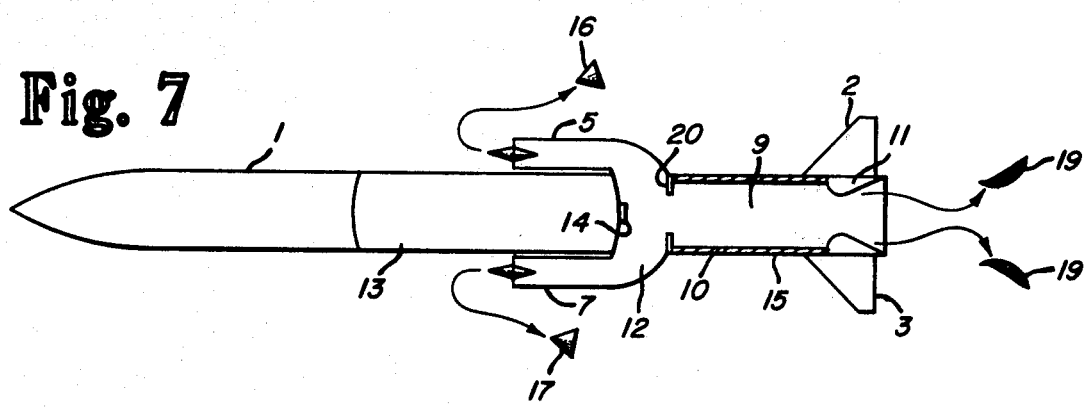
FIG. 7 is a schematic diagram of the embodiment of FIG. 6 during the transition from rocket to ramjet operation.
Figure 8:
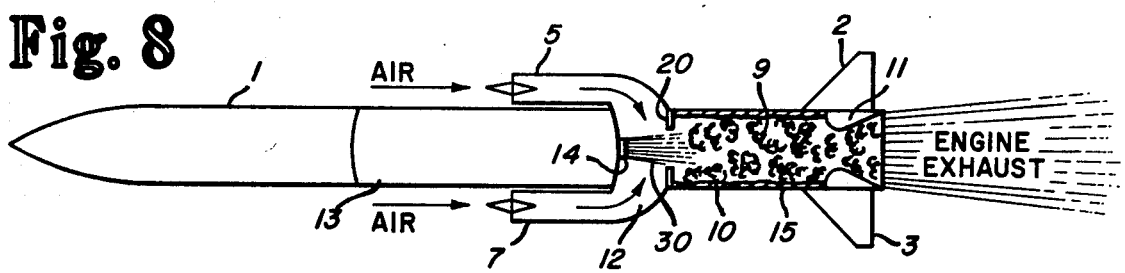
FIG. 8 is a schematic diagram of the embodiment of FIGS. 6 and 7 during the cruise phase of operation.

A typical embodiment of the present invention is illustrated schematically in FIGS. 4 and 5; and, operationally in FIGS. 6, 7, and 8. It is to be noted that parts common with the prior art devices, as illustrated in FIGS. 1, 2, and 3, bear the same reference numerals. The payload and control portion of the missile are carried in the forebody 1. Conventional fins 2 and 3, (and the fins in front of the partial section that are not referenced), stabilize and guide the missile. The air inlets 5, 6, 7, and 8 for the ramjet phase of operation all have covers, as illustrated 16 and 17 for air inlets 5 and 7, that are used during rocket boost to seal the inlets so that proper operation of the rocket can be accomplished. The exhaust nozzle 19 size required for boost is different than the nozzle size 11 for the cruise portion of flight. The rocket nozzle 19 is inserted inside of the cruise nozzle 11. The rocket propellant 18 is placed inside of the solid ramjet fuel 10. The rocket propellant burns during the boost phase of the missile flight as illustrated in FIG. 6. Once the rocket boost is complete and the rocket fuel 18 expended, the rocket nozzle 19 and inlet covers 17 are released and depart from the missile as illustrated in FIG. 7. The gas generator 13 is then ignited and then exhausts into the combustion chamber 9 through the gas generator exit 14 and plenum 12. Air is now entering the inlets 5, 7 and the solid fuel 10 is ignited by the hot gases coming out of the gas generator exit 14. The engine is now operating in the cruise mode of the missile flight.

A primary object of the invention is to provide a novel insulating lining for a combined rocket-ramjet missile engine combustion chamber that also provides additional fuel for combustion as the liner ablates away. Ideally, the ramjet solid fuel lining in the combustion chamber is substantially totally consumed simultaneously with the exhaustion of the gas generator and the termination of the powered portion of the missile flight. Thus, instead of a loss in performance due to volume and weight of conventional insulation necessary to prevent burn-through, substantially this volume and weight are turned into additional engine thrust. The techniques of engine construction for both rocket and ramjet operation are conventional and well known. Ring 20, FIGS. 4, 6, 7, and 8 is for flame stabilization and prevents blow-out of the solid ramjet fuel 10 while the missile is in the cruise phase of flight. Such a ring is not required for the rocket boost phase of operation but is well known in the solid fuel ramjet engine art, and is necessary for the satisfactory operation of the invention. The gas generator and the solid fuels used in the invention are conventional. A suitable gas generator is a typical mixture of ammonium perchlorate (AP) 70% by weight, hydroxyterminated polybutadiene (HTPB) 25% by weight, and aluminum oxide ($Al_2O_3$) 5% by weight. The conventional fuel mixture is contained in the gas generator chamber and is conventionally ignited and burned to provide a fuel rich gas flowing from the gas exit orifice 14 into the plenum 12. A suitable and conventional solid ramjet fuel 10 is HTPB 75% by weight and crosslink polystyrene (CLPS) 25% by weight. The solid ramjet fuel 10 is conventionally cast on the metallic wall 15 of the combustion chamber. A suitable booster rocket solid fuel 18 is conventional rocket propellant composed of AP 84% by weight, HTPB 11% by weight, and 5% conventional burn-rate additive and plasticizer. The rocket fuel is conventionally cast on top of the ramjet fuel. Those practicing this invention will conventionally determine the volumes and physical dimension of the particular fuels used in consideration of the desired missile characteristics.

I claim:

1. In a combined ducted rocket ramjet engine for a missile having a duct serving as a combustion chamber the wall of which is lined with solid rocket fuel for burning during the boost phase of missile flight and which terminates in a nozzle through which gaseous combustion products exit to produce thrust, having a fuel rich gas generator operative during the cruise phase of missile flight to discharge gaseous fuel into said combustion chamber, and having ram air inlets communicating with said combustion chamber which are closed during the boost phase and open during the cruise phase of missile flight, the improvement wherein the solid rocket fuel lining the combustion chamber is replaced by a two-layer lining in which the inner layer in immediate contact with the chamber wall is solid ramjet fuel containing no oxidizer and the outer layer is solid rocket fuel containing an oxidizer, the inner layer acting as an isulator during the boost phase, and as a fuel by its ablation during the cruise phase, after the outer layer of rocket fuel has been consumed during the boost phase, to augment the fuel supplied to the chamber by the gas generator and at the same time to protect the wall of the combustion chamber from the high combustion temperature during the cruise phase.

* * * * *